(12) United States Patent
Maschke et al.

(10) Patent No.: US 7,912,500 B2
(45) Date of Patent: Mar. 22, 2011

(54) MOBILE COMMUNICATION DEVICE, IN PARTICULAR IN THE FORM OF A MOBILE TELEPHONE

(75) Inventors: Janina Maschke, Lonnerstadt (DE); Michael Maschke, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1115 days.

(21) Appl. No.: 11/416,495

(22) Filed: May 2, 2006

(65) Prior Publication Data

US 2006/0252458 A1 Nov. 9, 2006

(30) Foreign Application Priority Data

May 3, 2005 (DE) .......................... 10 2005 020 688

(51) Int. Cl.
*H04B 7/15* (2006.01)
*H04B 15/00* (2006.01)
*H04B 7/00* (2006.01)
*H04M 1/66* (2006.01)
*H04M 1/68* (2006.01)
*H04M 1/00* (2006.01)
*H04W 40/00* (2009.01)
*A63H 3/00* (2006.01)
*A63F 9/24* (2006.01)
*G06F 17/00* (2006.01)
*G06F 19/00* (2006.01)

(52) U.S. Cl. ............... 455/556.1; 455/41.2; 455/410; 455/411; 455/445; 455/518; 455/11.1; 455/514; 446/268; 463/42; 463/1; 463/30; 463/31; 463/35; 463/36; 463/39

(58) Field of Classification Search ............... 455/41.2, 455/410, 411, 445, 518, 11.1, 514, 556.1; 446/268; 463/42, 1, 30–31, 35, 36, 39
See application file for complete search history.

(56) References Cited

U.S. PATENT DOCUMENTS

| | | | | |
|---|---|---|---|---|
| 5,880,731 A * | 3/1999 | Liles et al. | ..................... | 715/758 |
| 5,966,526 A * | 10/1999 | Yokoi | .............................. | 703/11 |
| 5,971,855 A | 10/1999 | Ng | | |
| 6,229,533 B1 * | 5/2001 | Farmer et al. | .................. | 345/473 |
| 6,268,872 B1 * | 7/2001 | Matsuda et al. | ............... | 345/473 |
| 6,494,762 B1 * | 12/2002 | Bushmitch et al. | ........... | 446/268 |
| 7,081,033 B1 * | 7/2006 | Mawle et al. | .................. | 446/175 |
| 7,104,884 B2 * | 9/2006 | Yokoi | ................. | 463/7 |
| 7,127,081 B1 * | 10/2006 | Erdem | .......................... | 382/103 |

(Continued)

FOREIGN PATENT DOCUMENTS

DE 297 18 358 U1 5/1998

(Continued)

OTHER PUBLICATIONS

Christoph Puhl, Stubenreine Haustiere—Tamagotchi, Furbi, Aibo and Co., Apr. 20, 2004, pp. 1-3, Retrieved from Internet on Dec. 14, 2006, http://www.spieletest.at/bericht.php?ID=54.

*Primary Examiner* — Matthew D Anderson
*Assistant Examiner* — Bobbak Safaipour

(57) ABSTRACT

The invention relates to a mobile communication device, in particular in the form of a mobile telephone, with a computer device for simulating a virtual living being in respect of the development of said living being, with a display device for outputting the development status of the virtual living being and with an input device for controlling the development of the virtual living being.

18 Claims, 4 Drawing Sheets

U.S. PATENT DOCUMENTS

| | | | |
|---|---|---|---|
| 7,605,861 B2 * | 10/2009 | LaSalle et al. | 348/371 |
| 2002/0094851 A1 * | 7/2002 | Rheey | 463/1 |
| 2003/0063001 A1 | 4/2003 | Hohberger et al. | |
| 2005/0054381 A1 * | 3/2005 | Lee et al. | 455/557 |
| 2006/0073079 A1 | 4/2006 | Goll et al. | |
| 2006/0177103 A1 * | 8/2006 | Hildreth | 382/107 |
| 2008/0096661 A1 * | 4/2008 | Ikeda et al. | 463/40 |
| 2008/0137913 A1 * | 6/2008 | Hildreth | 382/107 |
| 2009/0090305 A1 * | 4/2009 | Cheok et al. | 119/707 |

FOREIGN PATENT DOCUMENTS

| | | |
|---|---|---|
| DE | 298 05 828 U1 | 9/1998 |
| DE | 10 2004 046 762 A1 | 4/2006 |
| EP | 1 066 867 A2 | 1/2001 |
| JP | 2002 159 746 | 6/2002 |
| KR | 2002057629 | 7/2002 |
| KR | 2004014762 | 2/2004 |

* cited by examiner

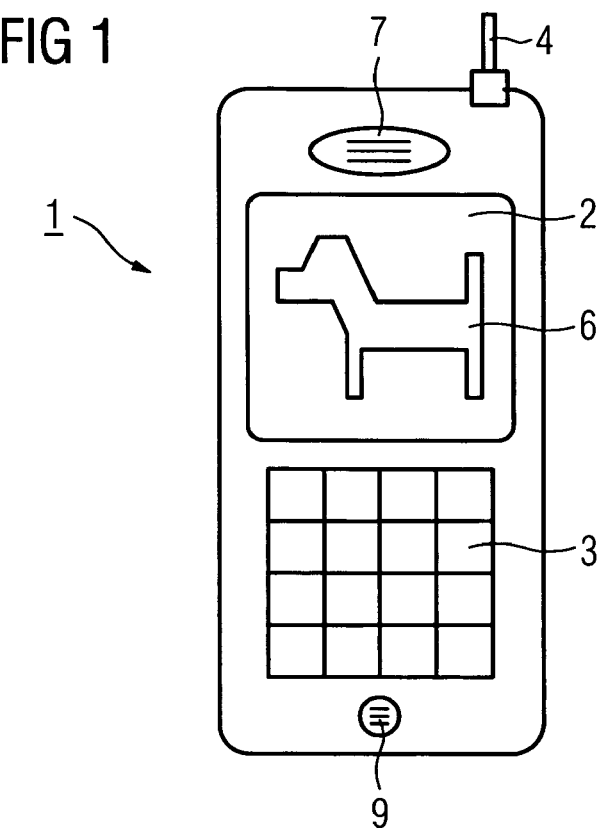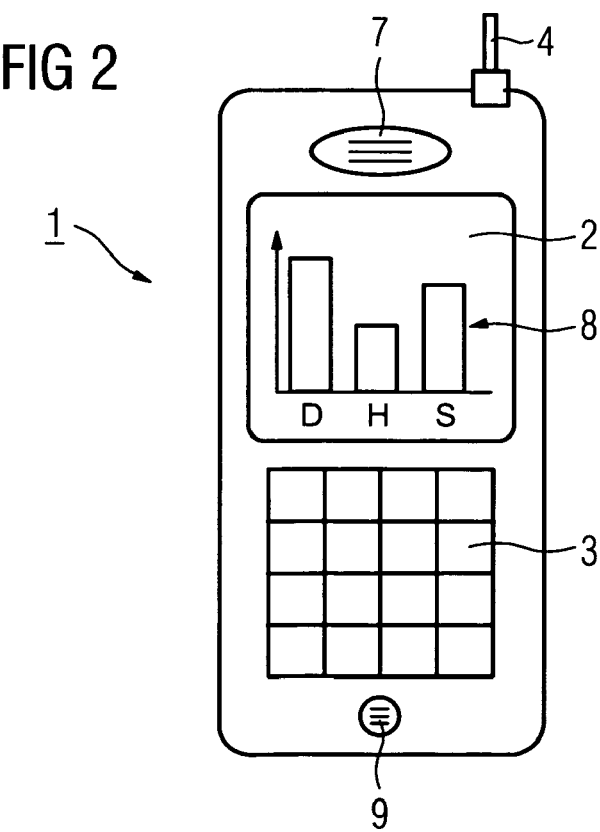

MOBILE COMMUNICATION DEVICE, IN PARTICULAR IN THE FORM OF A MOBILE TELEPHONE

CROSS REFERENCE TO RELATED APPLICATIONS

This application claims priority of German application No. 102005020688.3 filed May 3, 2005, which is incorporated by reference herein in its entirety.

FIELD OF THE INVENTION

The invention relates to a mobile communication device, in particular in the form of a mobile telephone.

BACKGROUND OF THE INVENTION

Mobile communication devices, in particular mobile telephones, are offered in a much sought after buyer's market, which is largely exhausted due to the intensive wooing of customers. Integrating new functions, such as, for example, for taking photos, in mobile communication devices, in order to increase the respective sales figures, is a generally well-known practice.

SUMMARY OF THE INVENTION

The object underlying the invention is to create a mobile communication device that has functions that appeal to new groups of buyers.

The object is achieved according to the invention by means of a mobile communication device with the features in accordance with the claims; advantageous embodiments of the invention are the subject-matter of the subclaims.

By means of the computer device for simulating a virtual living being in respect of the development of said living being, the display device for outputting the development status of the virtual living being and the input device for controlling the development of the virtual living being, the functionality of the mobile communication device is extended by a simulation game along the lines of the generally known Tamagotchi which is loved by children, so that this creates a further inducement for a child to buy this mobile communication device; as in this simulation game by controlling the development of the virtual living being, the child learns to take responsibility, this simulation game promotes the child's intellectual development, and as a result the parents of this child are also given an additional incentive to buy this mobile communication device for their child.

According to one embodiment of the invention, the display device is also used to display communications relevant information; this enables the mobile communication device to be produced simply and hence cost-effectively by avoiding an additional display device for displaying the communications relevant information, such as, for example, information regarding a respective communication receiver.

In order to display the development status of the virtual living being so that it can be made perceived especially clearly and quickly, the display device is designed for the graphic display of the living being itself and/or its development status.

According to one embodiment of the invention, the input device, in particular in the form of a keypad, is also used for the control of the communication functions of the communication device; thus it is possible to omit an otherwise necessary additional input device for controlling the communication functions, such as, for example, the dial-up of a respective communication receiver.

Automatic pausing of the simulation in the event of an incoming call allows the incoming call to be taken, without the simulation running on uncontrolled during a communication with the respective communication receiver. Thus the development of the virtual living being is prevented from taking a course unintended by the user without any possibility of control by the mobile communication device user in question who is occupied with the communication.

According to a further embodiment of the invention, the communication functions can be restricted on the one hand to accepting the incoming call and/or receiving messages and on the other hand to communication dial-up from a pre-definable list of communication receivers; the restriction of the communication functions allows, on the one hand, the operation of the communication functions to be simplified and, on the other hand, prevents the use of the undesired communication functions. The latter use of this embodiment of the invention is particularly advantageous for parents, who, in this way, can control the use of the mobile communication device by their child.

The development of a virtual living being in the form of a virtual plant and/or a virtual animal can be controlled particularly easily and intuitively.

A virtual living being in the form of a virtual person allows an especially complex yet intuitive simulation. A particularly high sense of responsibility is transmitted especially to a child as the user when the child is controlling a virtual person.

According to a further embodiment of the invention, a virtual person can be simulated in the form of a mobile communication device user figure who needs to be supported in his daily routine and instructions can be displayed to this user figure to help him in the daily routine; this allows an aid for the user figure that is supported by the simulation and is therefore, particularly well adapted to the daily routine of the user figure.

In order to be able to support the user figure more directly in his daily routine beyond mere instructions, an interface is provided to control a carer robot that supports the user figure in his daily routine with carer activities. Carer activities can include all activities that a trained carer can carry out. This includes, for example, the administration of medications or serving a meal at a time scheduled for that in the daily routine.

By transmitting the virtual living being via a communication link to the mobile communication device, in particular within a communication network accessible to the mobile communication device, it is possible to incorporate a new virtual living being into the simulation or to replace an existing virtual living being in the simulation by a new virtual living being, for example, following the simulated death of said existing virtual living being.

An interaction transmitted via a communication link of the virtual living being simulated on the communication device with a further living being simulated on a further communication device affords a further possibility for controlling the development of the virtual living being, in particular with respect to a social development.

According to one embodiment of the invention, the virtual living being is part of a virtual world which can be simulated on a computer with further virtual living beings, which are provided to interact with the living being simulated by the mobile communication device via the communication link; using the simulation through the medium of a computer, as opposed to just simulation on the mobile communication device, it is possible to simulate a particularly complex world with several virtual living beings interacting with each other.

Because the virtual living being simulated with the mobile communication device is quasi part of the virtual world via the mobile communication link, this gives a further possibility for controlling the development of the virtual life form.

According to one embodiment of the invention, a digital camera is integrated into the mobile communication device, whereby an object photographed using this camera can be accessed by the virtual living being as a virtual object, in particular in order to influence the development of the virtual living being; thus the simulation can be easily extended with objects from the environment of the user figure.

By means of an interface provided, according to a further embodiment of the invention, to control a robot corresponding to the virtual living being, the development status can be depicted particularly clearly using a movement of the robot.

BRIEF DESCRIPTION OF THE DRAWINGS

The invention and further advantageous embodiments of the invention according to the subclaims are explained in greater detail below with reference to exemplary embodiments illustrated by diagrams in the drawing, without hereby limiting the invention to this exemplary embodiment, in which;

FIG. 1 shows a mobile telephone for simulating a virtual dog displayed on the graphics display of the mobile telephone;

FIG. 2 shows the mobile telephone according to FIG. 1 with a development status of the virtual dog displayed on the graphics display by means of a bar chart;

FIG. 3 shows a robot corresponding to the virtual dog according to FIG. 1 or. FIG. 2, that can be controlled by the mobile telephone via a radio interface;

DETAILED DESCRIPTION OF THE INVENTION

Figure 3:
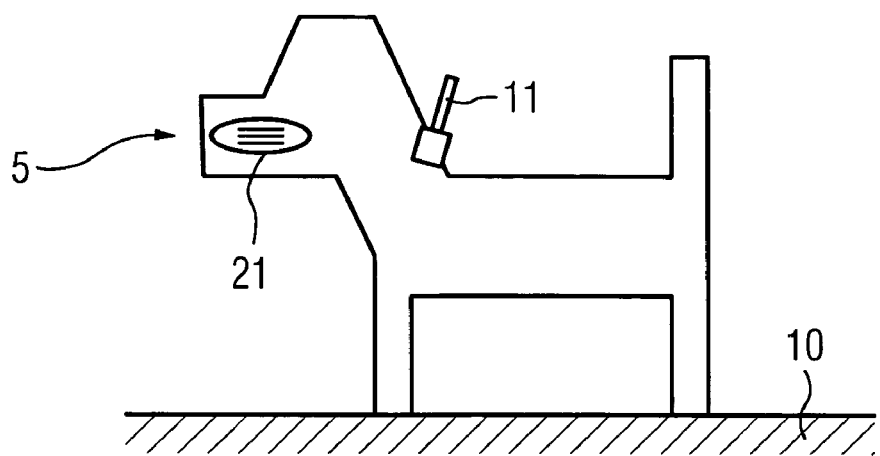

FIG. 1 and FIG. 2 each show a mobile communication device in the form of a mobile telephone 1 with a computing unit—which is not visible on the outside and therefore not illustrated—for simulating a virtual dog in respect of its development, with a display device in the form of graphics display 2 for outputting the development status of the virtual dog and with an input device in the form of a keypad 3 for controlling the development of the virtual dog. In addition, the mobile telephone 1 has a transmitting antenna 4, via which a radio link can be picked up with a robot 5 illustrated in FIG. 3 and corresponding to the virtual dog.

As shown in FIG. 1, a graphic image 6 of the virtual dog is displayed on the graphics display 2, whereby the respective development status can be recognized from a graphic representation, a measurement or a bearing of the virtual dog. In addition, the development status will be displayed by a behavior of the virtual dog, whereby the behavior is output on the one hand by an animated image 6 and on the other hand, by an acoustic sound reproduction by means of a loudspeaker 7.

As shown in FIG. 2, the development status of the virtual dog is output additionally by a bar chart 8, which has one bar each for development progress D, state of health H and stress load S. By a user input via the keypad 3, it is possible to toggle between the two different outputs of the development status represented in FIG. 1 and FIG. 2.

The development of the virtual dog is controlled by means of an input via keypad 3 by simulated feeding of the dog, by simulated play with the dog and by simulated grooming of the dog. In the case of the simulated feeding, possible food can be chosen from a food list, whereby, it is not just the respective choice of food that has an influence on the development status, but also the respective time of feeding. In the case of the simulated play, different types of games from a games list and different types of toys from a toy list can be combined, whereby some types of game, such as, for example, a retrieve game, are implemented in the form of an interactive controllable game of skill. In the case of the simulated grooming, different care products, such as, for example, a brush, can be selected from a care product list and can be applied to different areas of the body of the virtual dog.

The virtual dog can ask for the different actions, such as feeding, playing and grooming, and can refuse such actions. Each action has a specific influence on the development progress D, the state of health H and the stress load S, whereby a demand for or a refusal of an action influences the respective weighting of the influence. If the dog was not fed during a preset initial period of time, then first the stress load increases and through his behavior, the virtual dog demands to be fed. After a preset second period of time, which is longer than the first period of time, has expired, the state of health drops and the virtual dog indicates his desire to be fed soon by his behavior in ever shorter intervals and in an increasingly conspicuous manner. If food is given, the stress load decreases and the state of health rises to a normal level. However, if food continues not to be given, then the virtual dog dies and the development starts from the beginning again.

The graphics display 2 serves not only to display the development status but also to depict a menu with communication functions that can be selected using the keypad 3 and to depict the respective telephone number dialed. Selecting the respective communication function and inputting the respective telephone number is achieved by also using the keypad 3 provided for controlling the development of the virtual dog. A battery integrated into the mobile telephone is used as the power supply for the computing unit. The battery also serves as a source of energy for the communication functions of the mobile telephone. In addition, there is a microphone 9 provided for a telephone conversation. If there is an incoming call, the simulation of the virtual dog is paused and a function for taking the call and the menu are made available.

The communication functions can be restricted to accepting incoming calls, receiving messages and dialing-up certain pre-definable telephone numbers. This function can be used, for example, by parents who give the mobile telephone to their child. A restriction of the communication functions can only be changed or lifted by entering a password which is, for example, only known to the parents.

Instead of a dog, the simulation of a plant can be provided correspondingly.

FIG. 3 shows the robot 5 which can be controlled by the mobile telephone 1 via a receiving antenna 11. Control commands that can be transmitted via the radio link between the transmitting antenna 4 and the receiving antenna 11 are used to move said robot on a floor space 10 in such a way that in its behavior the robot corresponds to the virtual dog. Alternatively, it is also possible to control the movement of the robot 5 directly using the mobile telephone 1. The behavior of the virtual dog and thus also its development status can also additionally be displayed by outputting sounds or speech via a loudspeaker 21 that can be detected by the mobile telephone 1, arranged on the robot 5.

Figure 4:
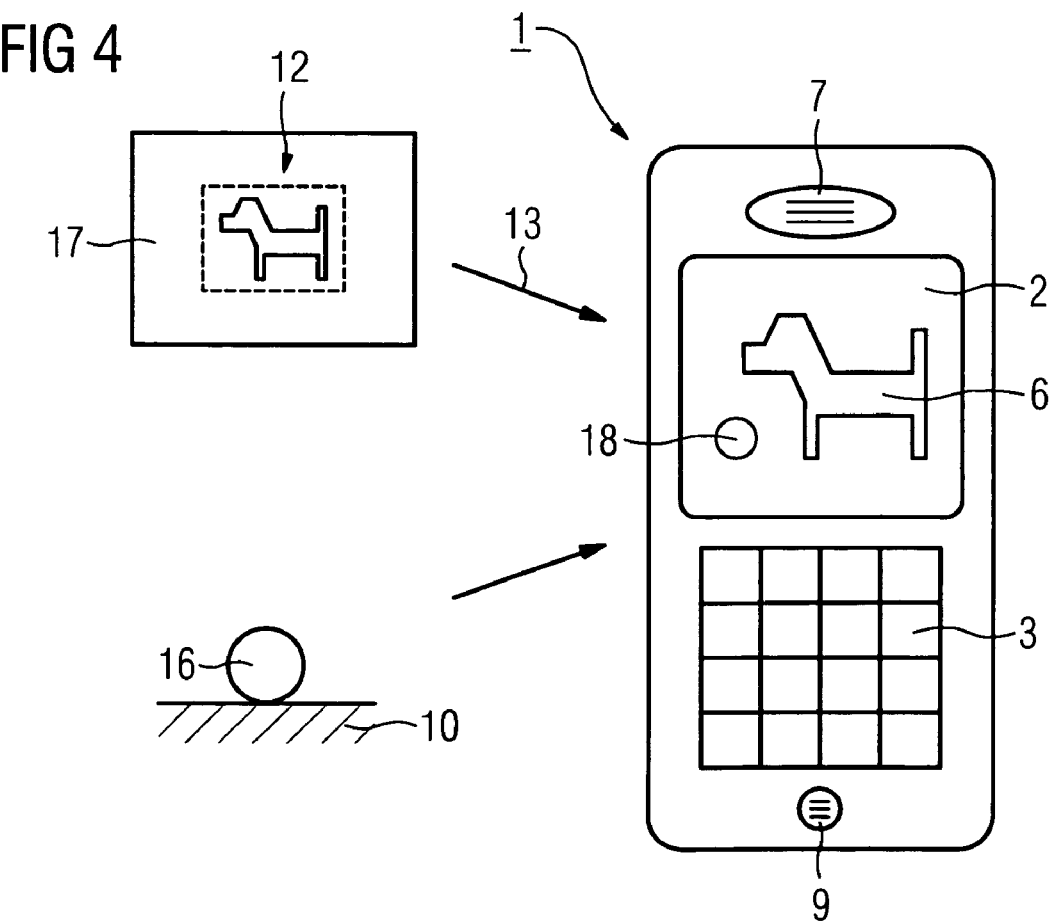
FIG. 4 shows the mobile telephone according to FIG. 1 with a virtual dog transmitted via a communication link and with a ball photographed using a digital camera.
Figure 5:
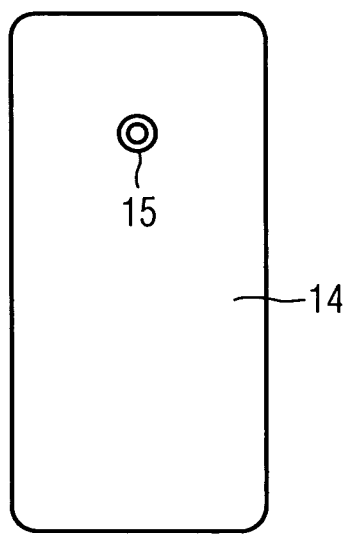
FIG. 5 shows the back of the mobile telephone according to FIG. 4 with the digital camera.

FIG. 4 and FIG. 5 show the mobile telephone 1 from a front view and from a back view as in FIGS. 1 and 2, whereby on the one hand, a virtual dog can be transmitted as file 12 via a communication link 13 to the mobile telephone 1 and on the other hand, using a digital camera 15 arranged on the back 14 of the mobile telephone 1, a photographed object, such as, for example, a ball 16 can be made accessible to the virtual dog.

Through a user input via the keypad 3, the communication link 13, is set up on a server, for example, in the form of a GPRS- or UMTS-data link—which is known per se—within a mobile network, to an external memory unit 17, and the file of the virtual dog is transmitted via the communication link 13. Several virtual dogs of different breeds or from different phases of their respective development can also be provided in the external memory unit 17.

Using the digital camera 15 photographed objects can be added to the food list as additional food and to the toy list as additional toys. In a simulated use of a photographed object, said object can be displayed as a virtual object on the graphics display 2—in the embodiment here in the form of a virtual ball 18. By virtue of its form or its color, the respective virtual object is allocated a certain influence on the development progress D, the state of health H and the stress load S. In addition, the virtual dog asks for certain objects, such as, for example, a red ball to play with and fulfilling this wish by taking a photo of a red, round object has a positive effect on the development.

Figure 6:
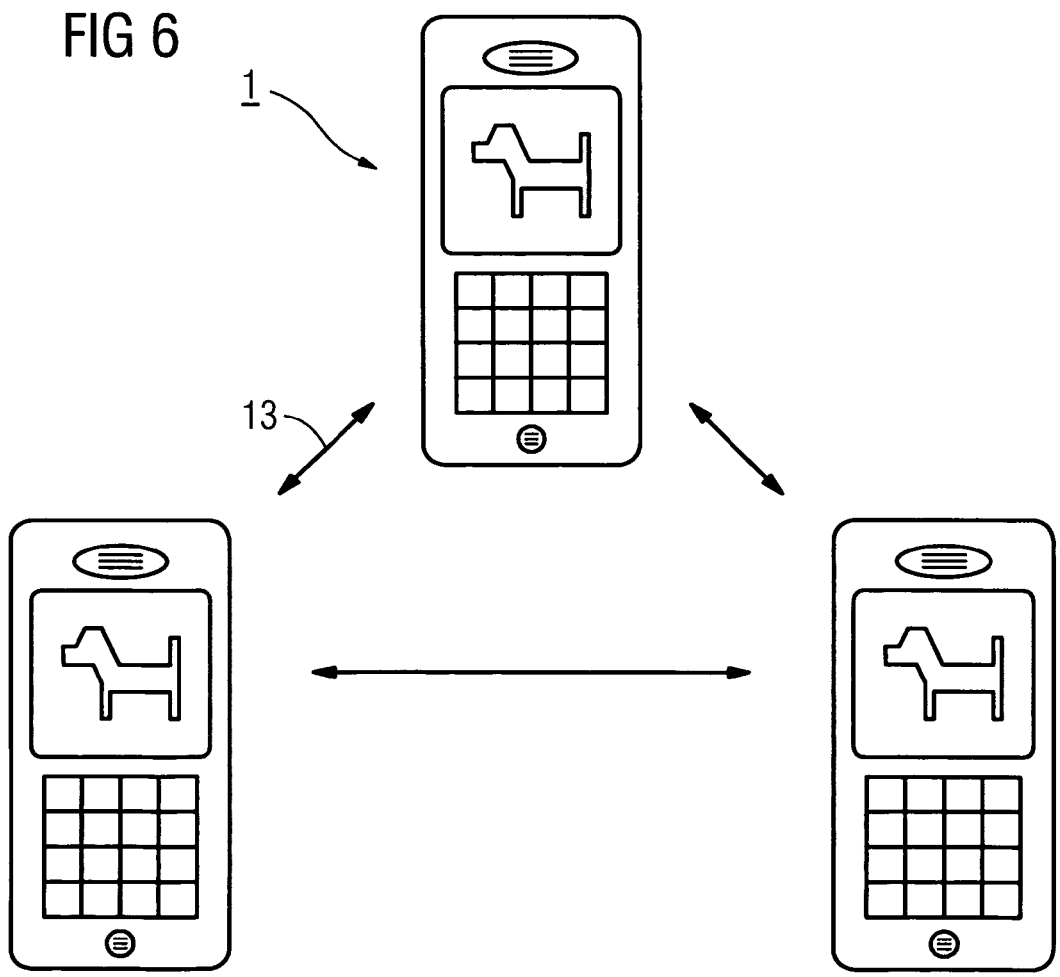
FIG. 6 shows three mobile telephones of the same kind according to FIG. 1, whose virtual dogs interact with each other via two-way alternate communication links.

FIG. 6 shows three mobile telephones 1 of the same kind according to FIG. 1, whose virtual dogs can interact with each other via two-way alternate communication links 13, so that the respective development states of the virtual dogs influence one another.

The interaction of the virtual dogs takes place, for example, by the dogs playing with each other in a virtual world. Thereby, the interaction influences the respective development status of the dogs according to certain pre-definable rules. When the virtual dogs play with each other, this normally reduces the stress load, whereby a virtual dog that has a particularly high stress load can also increase the stress load of the other virtual dogs. When the virtual dogs play with each other, this may involve virtual objects, such as, for example, a ball that originally was only available to one of the virtual dogs.

The number of virtual dogs that interact with each other via communication links is not restricted to just three, but can also be two or more than three.

Figure 7:
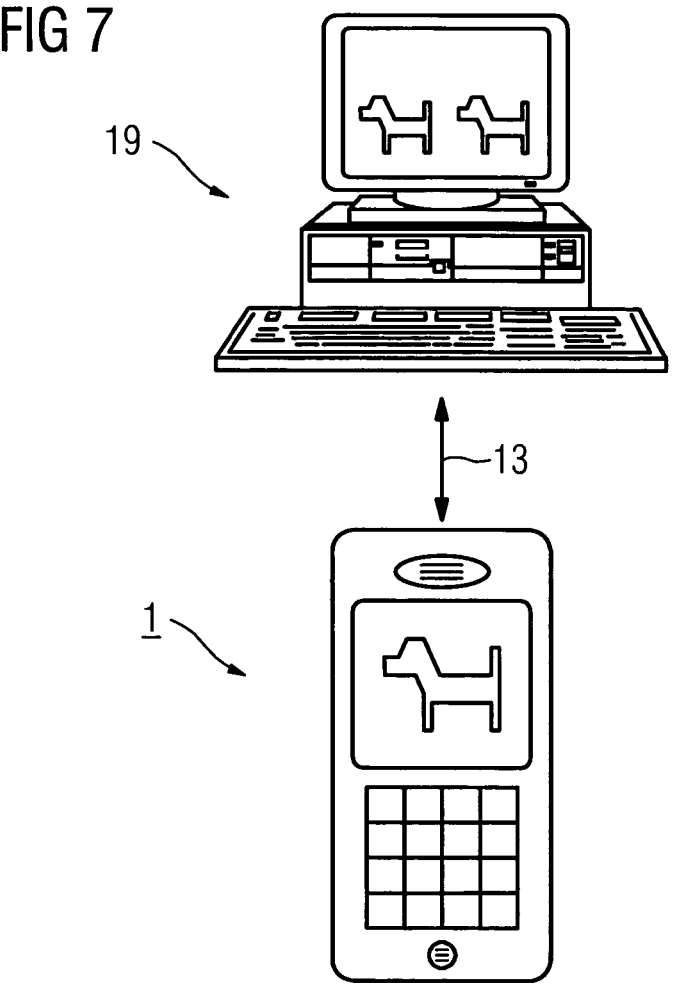
FIG. 7 shows a mobile telephone according to FIG. 1, of which the virtual dog interacts via a two-way alternate communication link with two virtual dogs simulated on a computer.

FIG. 7 shows the mobile telephone 1 according to FIG. 1, of which the virtual dog can, via the two-way alternate communication link 13, interact with two virtual dogs simulated on a computer 19. Analogous to the interaction of three virtual dogs depicted in FIG. 6, the interaction of the three dogs in FIG. 7 also occurs in a virtual world in which the virtual dogs can, for example, play with each other.

From a world that is initially only simulated on the computer 19, it is also possible to transmit a virtual dog to as a file 12 to the mobile telephone 1—as shown in FIG. 4—and that said virtual dog develops there for a certain time, independently of the virtual world. In this case, the computer 19 from FIG. 7 corresponds to the external memory unit 17 from FIG. 4.

On the computer 19 it is possible to simulate not only two but also only one or more than two virtual dogs. In addition, more than only one mobile telephone 1 can be connected to the computer 19.

Figure 8:
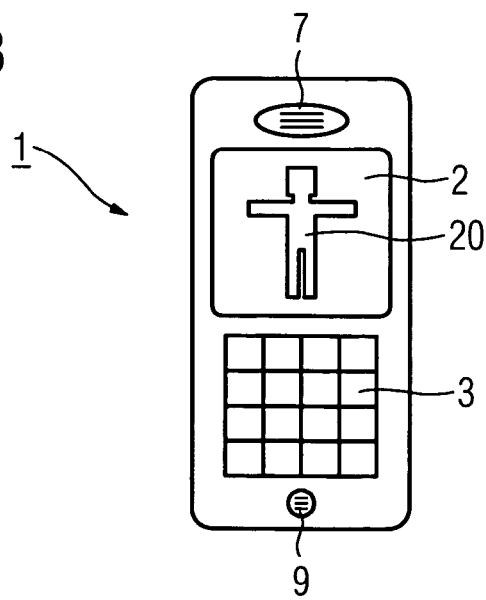
FIG. 8 shows a mobile telephone according to FIG. 1 for simulating a virtual person displayed in the graphics display.

FIG. 8 shows the mobile telephone 1 according to FIG. 1 with a graphic image 20 of a virtual person simulated using the mobile telephone 1, which virtual person corresponds to a user figure that requires support in his daily routine. Based on a simulation of the daily routine, the user figure is given instructions at specified times in the daily routine. The instructions are output e.g. in graphic form using image 20 of the virtual person.

Additionally it is possible to control a support or carer robot—instead of the robot in the form of a dog depicted in FIG. 3—via a radio link to the mobile telephone.

A user interface represented on the graphics display 2 with a humanlike "avatar" is conceivable in particular for user figures in need of support.

Higher quality graphic presentations are achieved by using a larger external monitor instead of the graphics display 2 integrated into the mobile telephone. Additional video clips with instructions or user tips for the mobile telephone 1 can be loaded via an external video source, e.g. a DVD player.

The invention claimed is:

1. A mobile communication device, comprising:
   a computer device for simulating a development of a virtual living being;
   an input device for controlling the development of the virtual living being;
   a display device for outputting a development status of the virtual living being; and
   an integrated digital camera for photographing an object that is accessible to the virtual living being as a virtual object to influence the development of the virtual living being,
   wherein a communication function of the mobile communication device is restricted on to accepting incoming calls and receiving messages and to dialing-up certain pre-definable telephone numbers for preventing undesired communication functions when the mobile communication device is given to a child by parents,
   wherein the restriction of the mobile communication device is only changed or lifted by entering a password which is only known to the parents,
   wherein the development status of the virtual living being is output by an animated image and an acoustic sound produced by a loudspeaker, or
   wherein the development status of the virtual living being is output by bar charts each bar chart representing development progress, state of health, and stress load, and
   wherein the mobile communication device is configure to switch between the two different outputs of the development status of the virtual living being.

2. The mobile communication device as claimed in claim 1, wherein the display device is used to display communication relevant information.

3. The mobile communication device as claimed in claim 2, wherein the display device is used for graphic display of the virtual living being.

4. The mobile communication device as claimed in claim 3, wherein the display device is used for graphic display of the development status of the virtual living being.

5. The mobile communication device as claimed in claim 4, wherein the input device is also used for a control of a communication function of the mobile communication device.

6. The mobile communication device as claimed in claim 5, wherein the input device is a keypad.

7. The mobile communication device as claimed in claim 1, wherein a provision is made for pausing a simulation when there is an incoming call.

8. The mobile communication device as claimed in claim 1, wherein the virtual living being is a virtual plant.

9. The mobile communication device as claimed in claim 1, wherein the virtual living being is a virtual animal.

10. The mobile communication device as claimed in claim 1, wherein the virtual living being is a virtual person.

11. The mobile communication device as claimed in claim 1, wherein the virtual living being is simulated as a mobile communication device user figure and instructions for helping the mobile communication device user figure in a daily routine are displayed on the display device.

12. The mobile communication device as claimed in claim 1, wherein the virtual living being is simulated as a mobile communication device user figure and a carer robot for supporting the mobile communication device user figure in daily routine with carer activities is controlled via an interface in stead of controlling the virtual living being.

13. The mobile communication device as claimed in claim 1, wherein the virtual living being is transmitted directly to the mobile communication device via a communication link.

14. The mobile communication device as claimed in claim 13, wherein the communication link is within a communication network accessible to the mobile communication device.

15. The mobile communication device as claimed in claim 1, wherein the virtual living being interacts with a further virtual living being simulated by a further communication device via a communication link.

16. The mobile communication device as claimed in claim 1, wherein the virtual living being is a part of a virtual world that is simulated on a computer with a plurality of virtual living beings who interact with the virtual living being simulated by the mobile communication device via a communication link.

17. The mobile communication device as claimed in claim 1, wherein a robot corresponding to the virtual living being is controlled and moved on a floor space via an interface by the mobile communication device for an corresponding behavior of the virtual living being.

18. The mobile communication device as claimed in claim 1, wherein the mobile communication device is a mobile telephone.

* * * * *